Oct. 16, 1923.

G. C. HOSCH 1,470,839

AUXILIARY CHART COMPUTING MACHINE

Filed March 24, 1921        2 Sheets-Sheet 1

Inventor:
G. Carlton Hosch.
By Elliott
Attorneys

Oct. 16, 1923.

G. C. HOSCH 1,470,839

AUXILIARY CHART COMPUTING MACHINE

Filed March 24, 1921    2 Sheets-Sheet 2

Inventor:
G. Carlton Hosch.
By Elliott Thurman
Attorneys.

Patented Oct. 16, 1923.

1,470,839

UNITED STATES PATENT OFFICE.

GREENE CARLTON HOSCH, OF ST. LOUIS, MISSOURI, ASSIGNOR TO THE MEASUREGRAPH COMPANY, OF ST. LOUIS, MISSOURI, A CORPORATION OF DELAWARE.

AUXILIARY CHART COMPUTING MACHINE.

Application filed March 24, 1921. Serial No. 455,110.

*To all whom it may concern:*

Be it known that GREENE CARLTON HOSCH, a citizen of the United States, residing in the city of St. Louis, and State of Missouri, has invented new and useful Improvements in Auxiliary Chart Computing Machines, of which the following is a specification.

This invention relates to measuring and computing machines and the invention may be applied to any machine which performs or indicates a measurement and which includes means for indicating a computation which is a function of the indicated length.

In the present specification, the invention is described as embodied in a machine for indicating the length of an article such as a piece of fabric and which operates to compute the sale charge to be made for the measured length at different prices or rates for the unit of measure.

As usually constructed, these machines include a length indicator which indicates units of length and aliquot fractions of the unit of length. They also include a chart or charts which are driven in unison with the length indicator and these charts bear computed figures which correspond to any length measured in units and the said aliquot fractions which are indicated by the scale of the length indicator. They do not carry any computations corresponding to smaller divisions than the aliquot fraction; for example, it is impossible to compute any quantity not commensurable in eighths of the unit of measure.

The general object of the present invention is to provide simple means for enabling a machine of this type to be used to compute the sale charge to be made for any length, whatever that may be indicated by the machine.

The invention consists in the novel features, and in the general combination of parts to be particularly described hereinafter, all of which contribute to produce a simple and efficient auxiliary chart computing machine. A preferred embodiment of my invention will be particularly described in the following specification, while the broad scope of my invention will be pointed out in the appended claims.

In the drawing.

Figure 1:
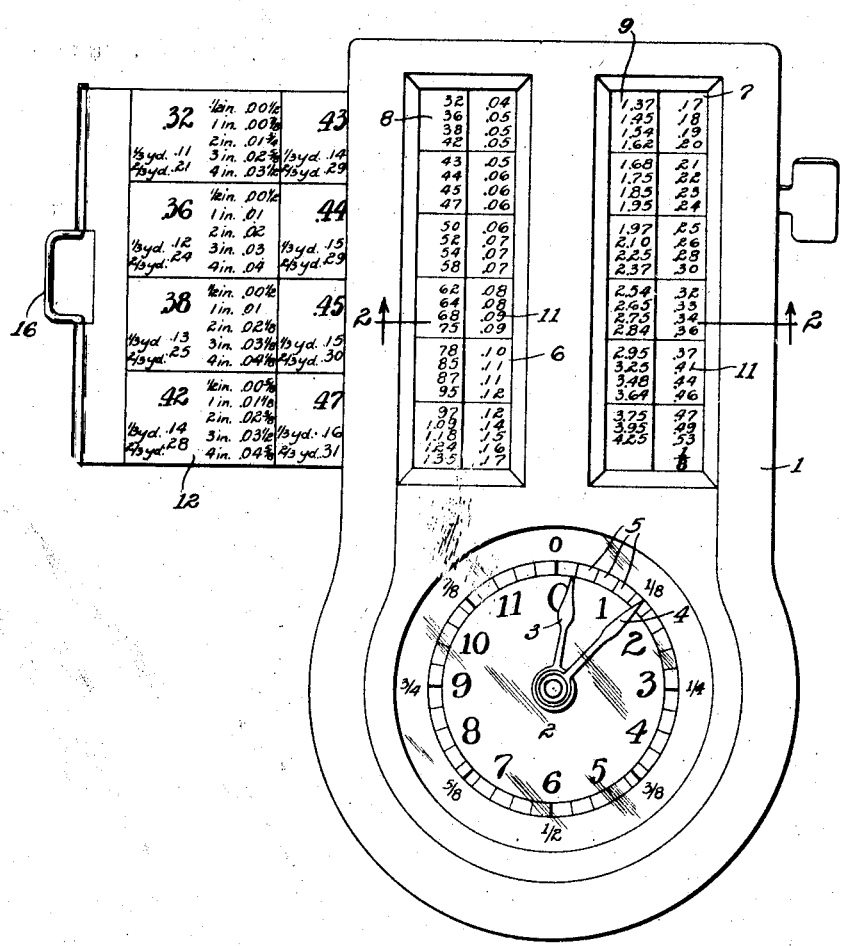
Figure 1 is a plan of a machine embodying my invention and representing the auxiliary chart as partially extended as though in use.

Referring more particularly to the parts, 1 represents the casing of the machine which may be of any suitable form and this casing is provided on its upper side with a length indicator comprising a dial 2 which may be provided with two indicating pointers or hands 3 and 4, the former of which co-operates with large numbers 1 to 12, which form part of a scale on the face of the dial; this scale also includes fractional numbers $\frac{1}{8}$, $\frac{1}{4}$, etc, which represent aliquot fractions of the unit of measure. The pointer 4 is driven so that it makes one complete revolution of the dial as the pointer 3 is moving through the space between adjacent integers on the face of the dial.

In addition to this the dial scale includes a plurality of smaller divisions 5 which are smaller than the fractional spaces or divisions.

The length indicator may be adapted to be used with any desired unit of measure. In the present instance the unit of measure is supposed to be a yard and the fractional divisions represent eighths of a yard, while the divisions 5 indicate inches.

Figure 2:
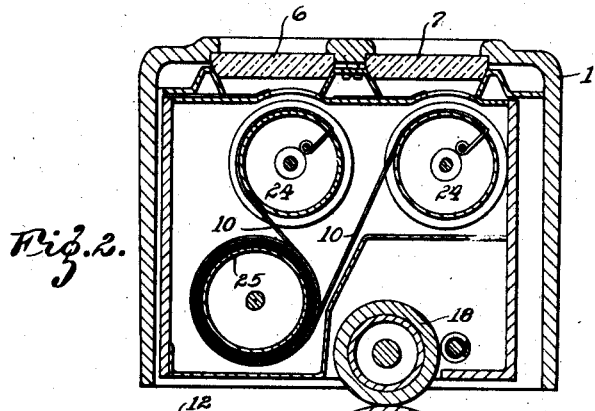
Figure 2 is a vertical section taken through the machine about on the line 2—2, of Figure 1 and particularly illustrating the relation of the main chart or charts and the auxiliary chart.

The upper side of the casing is also constructed so as to display a chart or charts bearing computed figures which are functions of the indicated lengths at different prices or rates. In the present instance the casing is provided with two windows 6 and 7 and these windows are provided with fixed scales 8 and 9, respectively, which carry numbers indicating different prices per yard. Charts 10 are provided, see Figure 2, which are disposed beneath the windows, respectively, and these charts carry numbers 11 which align with the numbers on the fixed scales 8 and 9. The numbers on the charts are functions of the corresponding numbers on the fixed scale and also of the length indicated by the hands or pointers 3 and 4. For example, in Figure 1, the numbers on the charts indicate the sale charges to be made for quantities increasing by eighths of a yard of material, at the different rates.

It is not feasible to provide computations corresponding to inches on such a chart, although it is often desired to measure off and sell a quantity commensurable only in inches. In order to overcome this difficulty I provide an auxiliary chart or interpolating chart 12 (see Figures 1 and 2). This chart is carried on the casing 1 and is preferably mounted in the base 1ª of the casing, wrapped upon a roller 13 carrying an internal coil spring 14 which tends to keep the chart wrapped upon the roller. The end of the chart passes through an opening 15 in the side wall of the casing and carries a small bail or handle 16 which must be grasped to extend the chart when it is to be examined. The space on this auxiliary chart is divided into blocks or "squares" and each of these squares bears a price rate number, such as the numbers 32, 36, 38, etc. These numbers are the same price numbers or rates which are carried by the scales 8 and 9 which co-operate with the main charts 10. In each square a small table is placed indicating the charge to be made at the rate for that square for different amounts, for example, ½ an inch, 1 inch, etc. up to 4 inches; each square also carries a computed figure indicating the charge for ⅓ of a yard and ⅔ of a yard. In other words, these computed figures on the auxiliary chart are interpolated with respect to the computed figures of the main charts.

In using a machine embodying my auxiliary chart any desired quantity can be measured and the computed charge readily ascertained. If the measured length is commensurable in eighths of a yard then the main charts will indicate exactly the sale charge to be made. If the length is not commensurable then it is merely necessary to add to the computed figure of the main chart, the additional amount to be charged for the number of inches to the nearest aliquot fraction for which the main charts carry computations.

Figure 3:
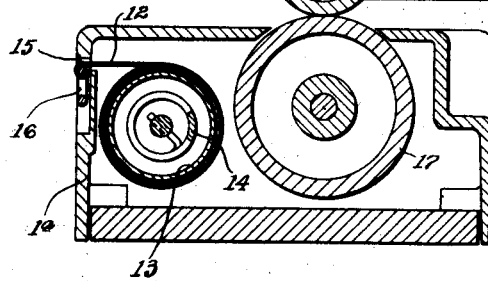
Figure 3 is a vertical section through the frame of the machine and particularly illustrating the driving train by means of which the main charts are driven from the measuring roller.
Figure 3:
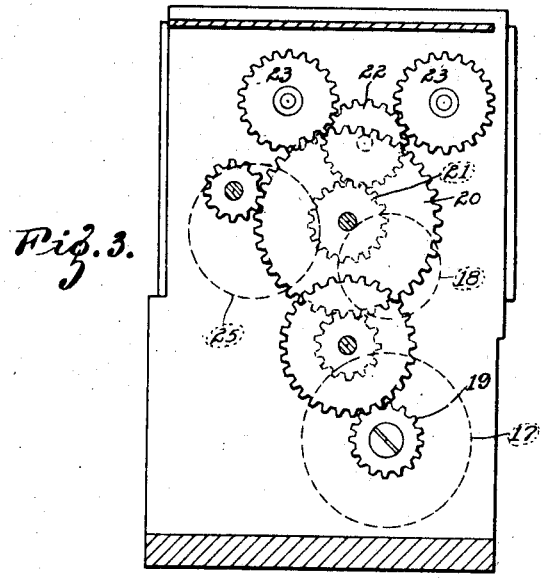
Figure 4:
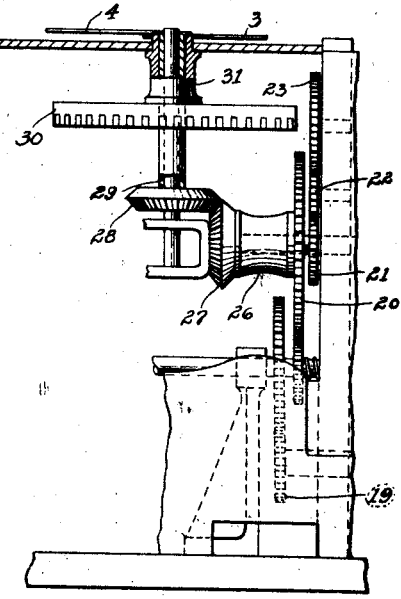
Figure 4 is a side elevation showing details of the drive to the length indicator.

Any suitable means may be provided for driving the indicating pointers 3 and 4 and the charts 10 in unison. A simple mechanism for this purpose is illustrated in Figures 3 and 4. The fabric to be measured is pulled between the measuring roller 17 and the presser roller 18, and the shaft of the measuring roller carries a pinion 19 (see Figure 3) which drives a gear train including a large gear 20. A pinion 21 rigid with this gear wheel 20 drives an idler 22 which meshes with gear wheels 23 carried on the shafts of take-up rollers 24 upon which the charts 10 wrap, (see Figure 2). These charts are normally held coiled upon a spring roller 25. The drive to the pointers 3 and 4 is effected by means of a sleeve 26 (see Figure 4) which is rigid with the large gear wheel 20 and this sleeve carries a bevel gear wheel 27 which meshes with another gear wheel 28 attached to the lower end of a spindle 29, the upper end of which carries the inch pointer 4. On the tubular spindle 29 a reduction gear 30 is provided, the details of which are illustrated in the application of John L. Wheeler, Serial No. 425,646, from which an outer tubular spindle 31 is driven, and this spindle at its upper end carries the pointer or hand 3.

It is understood that the embodiment of the invention described herein is only one of the many embodiments my invention may take, and I do not wish to be limited in the practice of my invention nor in my claims, to the particular embodiment set forth.

What I claim is:—

1. In a measuring and cost computing machine having length indicating means and a chart driven in unison with the indicating means and bearing computed figures corresponding to a unit of measure and relatively large aliquot fractions thereof at different prices or rates for the unit of measure, an interpolating chart associated with the machine and constructed to be extended at the will of the operator, said interpolating chart bearing computed figures interpolated with respect to the computed figures of the first named chart and corresponding to relatively small divisions of the indicating scale at the same prices or rates per unit of measure.

2. In a measuring and cost computing machine having length indicating means and a chart driven in unison with the indicating means and bearing computed figures corresponding to a unit of measure and relatively large aliquot fractions thereof at different prices or rates for the unit of measure, an interpolating chart carried by the machine and constructed to be extended at the will of the operator, said interpolating chart bearing computed figures interpolated with respect to the computated figures of the first named chart and corresponding to relatively small divisions of the indicating scale at the same prices or rates per unit of measure.

In testimony whereof, I have hereunto set my hand.

GREENE CARLTON HOSCH.